United States Patent [19]

Kopf

[11] Patent Number: 4,872,723
[45] Date of Patent: Oct. 10, 1989

[54] SAFETY TRAY

[75] Inventor: Thomas W. Kopf, Littleton, Colo.

[73] Assignee: Master Products Inc., Des Moines, Iowa

[21] Appl. No.: 163,787

[22] Filed: Mar. 3, 1988

[51] Int. Cl.$^4$ .............................................. B60R 21/00
[52] U.S. Cl. .................................... 297/216; 206/564; 206/557; 224/275; 108/44
[58] Field of Search ................. 224/328, 275; 108/44; 206/557, 561, 562, 564; 297/287, 288, 216

[56] References Cited

U.S. PATENT DOCUMENTS

| | | | |
|---|---|---|---|
| 2,837,388 | 6/1958 | Majeroni et al. | 108/44 X |
| 2,998,214 | 8/1961 | Peterman | 297/216 X |
| 3,386,392 | 6/1968 | Gramm | 108/44 |
| 3,606,457 | 6/1971 | Reay | 297/216 X |
| 4,031,579 | 6/1977 | Larned | 297/216 X |
| 4,143,915 | 3/1979 | Kamlay | 297/216 X |
| 4,346,833 | 8/1982 | Bernhardt | 206/459 X |
| 4,500,135 | 2/1985 | Kincheloe | 297/216 X |

FOREIGN PATENT DOCUMENTS 2513950  4/1983  France ............................ 297/216

Primary Examiner—Stephen Marcus
Assistant Examiner—Christine A. Peterson
Attorney, Agent, or Firm—Charles C. Corbin

[57] ABSTRACT

A lightweight safety tray particularly suitable for use in the passenger compartment of a moving vehicle, and including a generally rectangular support frame of low density, highly resilient polymeric material, which frame has a flat bottom, front, rear and opposing side walls, with a sunken planar shelf in the upper surface portion of the frame which is bounded by upward extensions of the frame walls. The planar shelf has an array of regular shaped cavities in its upper surface which provides a grid of longitudinally and transversely extending ribs. A generally flat plastic corrugated board covers the planar shelf. There is a flexible, resilient plastic outer coating which envelopes the entire outer surfaces of the combined frame and corrugated board, and which holds the board in place, and whereby an upper tray working surface is provided which is bounded on four sides by the upward wall extensions.

10 Claims, 3 Drawing Sheets

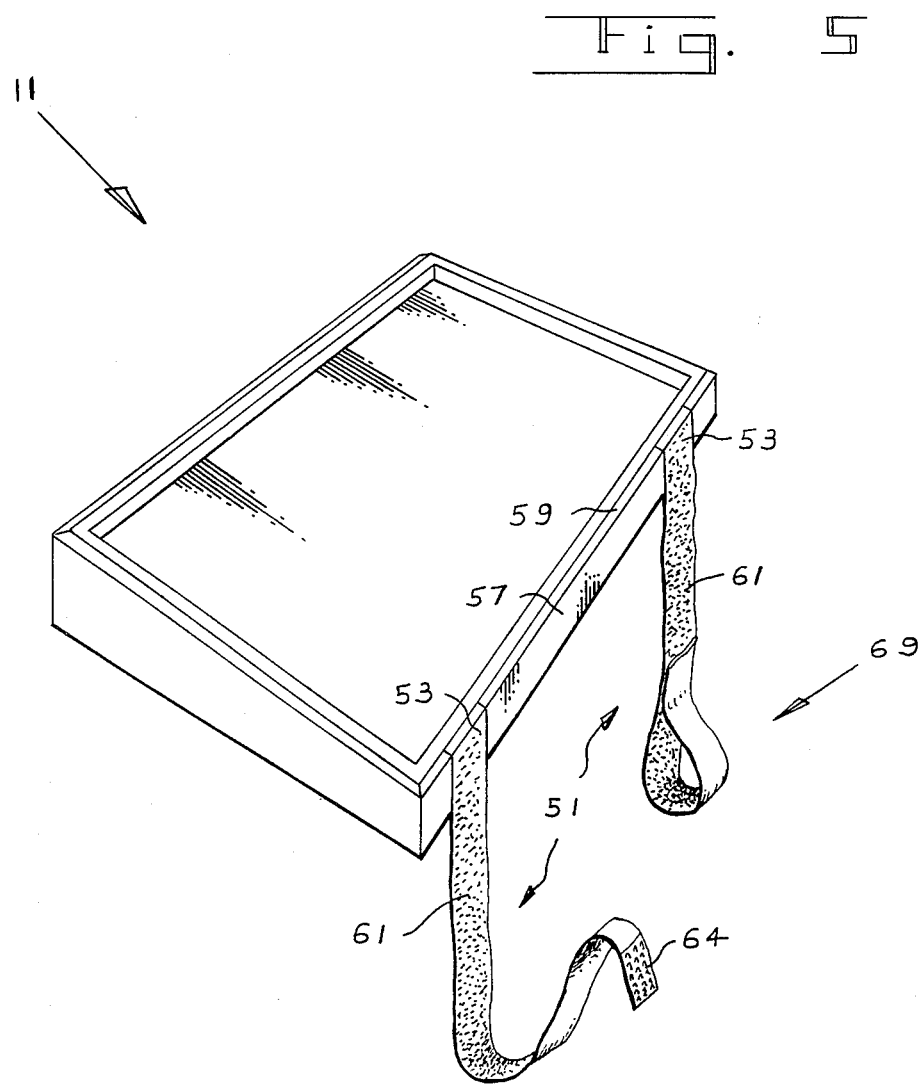

SAFETY TRAY

BACKGROUND OF THE INVENTION

The invention relates generally to a tray construction and more specifically to a lightweight tray whose structure is designed to be highly resilient and collapsible under force of impact.

The prior art contains many serving trays of various designs and applications, however there remains the need for a lightweight tray which has the safety aspects, and other qualities, which make it ideally suited for use within the passenger compartment of a moving vehicle. In addition there is a need for such a tray that meets the utilitarian, safety and hygienic needs of both children and adult vehicle occupants.

SUMMARY OF THE INVENTION

In view of the foregoing it is an object of the present invention to provide a tray having a construction which is sufficiently rigid for its intended use but which is highly deformable and shock absorbent when subjected to high impact.

Another object is to provide a tray which is sufficiently light-weight so as to be easily handled by a small child.

A further object is to provide a tray which has an outer surface that is washable, hygienic and non-toxic. A still further object of the invention is to provide a safety tray that can be economically manufactured.

The foregoing and further objects and advantages are attained by the tray construction of the present invention which includes a generally rectangular tray support frame having a generally flat bottom surface, and a front wall, rear wall and opposing side walls, and an upper surface characterized by a recessed generally rectangular planar shelf, bounded on its sides by upward extensions of the frame walls. The upper surface of the planar shelf has an array of a plurality of regular shaped cavities therein which cavities extend to a substantial depth, and which cavities are bounded by a grid of longitudinally and transversely extending ribs. The invention further includes a plastic corrugated board for supporting a working surface, which board comprises a flat upper sheet and a flat lower sheet with a corrugated layer attached therebetween. The corrugated board covers the planar shelf and engages the top surfaces of the ribs, and the furrows and ridges of the board extend in a direction parallel to the front and rear frame walls. Finally there is a resilient, flexible, moisture-proof plastic overcoating that envelopes the entire outer surface of the combined frame and corrugated board.

A modification of the invention employs a pair of harnessing straps that extend downwardly from spaced-apart locations on the frame rear wall. They are Velcro equipped for adjustably and releasably securing the tray to structures within a vehicle.

BRIEF DESCRIPTION OF DRAWINGS

FIG. 5 is a perspective view showing the tray of the invention with harnessing straps.

DETAILED DESCRIPTION

Figure 1:
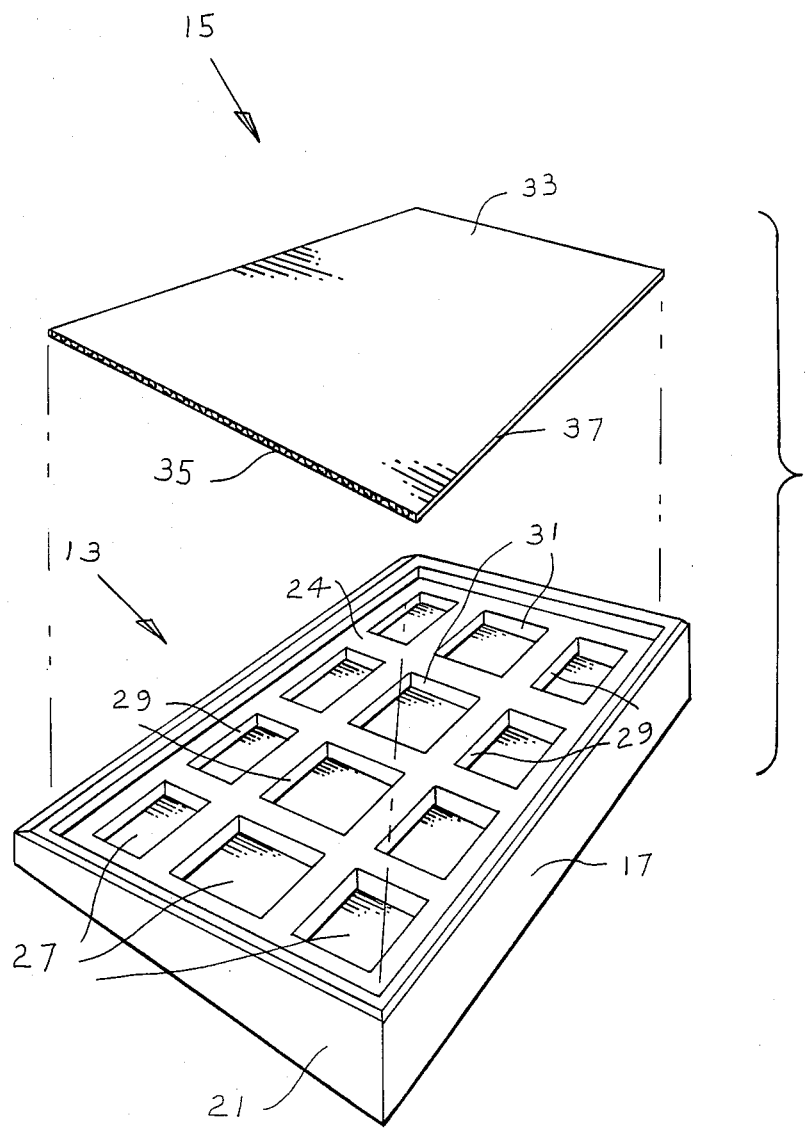
FIG. 1 is an exploded perspective view of major components of a safety tray according to the invention.
Figure 2:
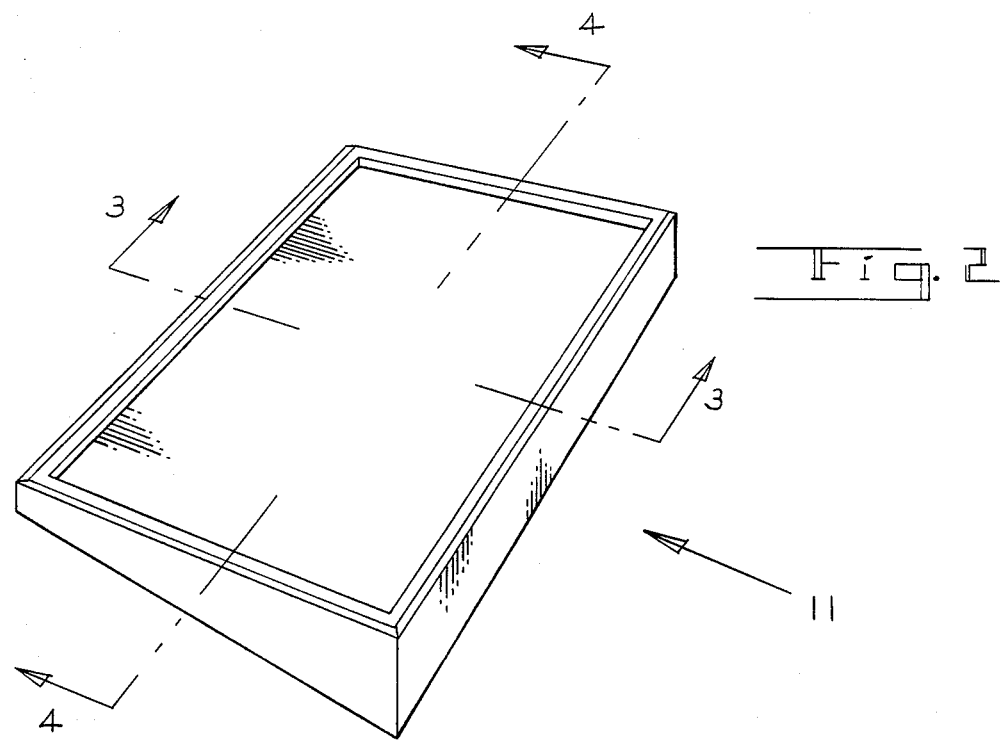
FIG. 2 is a perspective view of a safety tray constructed according to the present invention.
Figure 3:
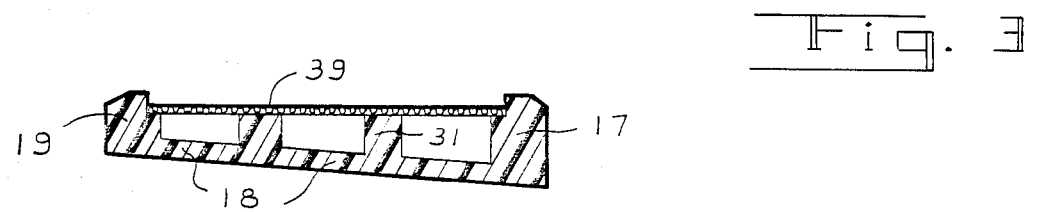
FIG. 3 is a sectional view taken along the line 3—3 of FIG. 2.
Figure 4:
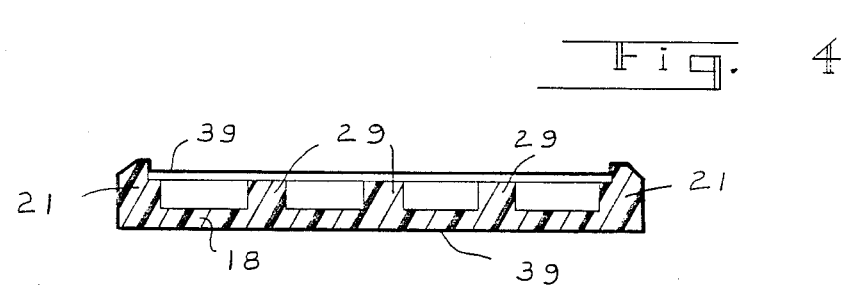
FIG. 4 is a sectional view taken along the line 4—4 of FIG. 2.

Referring now to the drawings it is shown in FIG. 1 and FIG. 2 that two of the main components of the inventive structure of safety tray 11 comprises a molded support frame 13 and corrugated board member 15. As best shown in FIGS. 3 and 4 the support frame 13 has front wall 17, rear wall 19 and side walls 21. A rectangular recessed planar shelf 24 lying in the upper surface of frame 13 is provided with an array of rectangular cavities 27, which cavities extend to a substantial depth to a bottom wall 18. It is seen that this array of cavities 27 leave a grid-like pattern of intersecting longitudinal ribs 29 and transverse ribs 31 which serve to provide frame 13 with structural stability, and, as will be described hereinafter, will serve to support the undersurface of board 15. It will become apparent upon further reading that the array of cavities 27 and the accompanying spaced-apart ribs 29 and 31 advantageously combine to give the assembled tray 11 a lightweight structure with sufficient stability for its normal intended use, as well as increasing the shock-absorbency and collapsibility of frame 13 by providing voids into which the entire structure may collapse upon itself should it be subjected to high forces of impact tending to compress opposing side walls 21, or front and rear walls 17 and 19, towards each other. These structural features combine with the high resiliency and low density of the frame wall material itself, which is described hereinafter, to optimize the deformability of frame 13.

Frame 13 is steam molded by techniques known in the plastic molding industry and is composed of polypropylene, closed cell foam, which material is selected to give the frame high resiliency in all directions and low density. This is achieved when the molding process uses low density, highly resilient pre-expanded polypropylene precursor beads. In the preferred embodiment the beads have an average diameter of about 3/16 inch and provide a material density in the range of 1.0 to 2.0 lb. per cubic ft. An example of such suitable pre-expanded beads is those available under the trademark Arpro. It is noted by reference to FIG. 3 that although front wall 17 and rear wall 19 vary in height the frame bottom wall 18 has a uniform thickness, which in turn serves to provide wall 18 with uniform qualities of resiliency and collapsibility in front-to-rear and side-to-side directions.

The invention further includes a plastic corrugated top board 15 which comprises a flat top sheet 33, bottom sheet 35, with a corrugated layer 37 bonded therebetween. Board 15 is dimensioned so as to be received upon recessed shelf 24 snugly between the upward extensions of the walls of frame 13. It is to be noted that the furrows and ridges of corrugated layer 37 lie parallel to the front and rear frame walls 17 and 19. This feature provides for maximum collapsibility of board 15 in the front-to-rear direction, which is the likely direction of impacting force upon a person holding tray 11, (in the event of vehicular accident). It will be seen that in the assembly of tray 11 that board 15 is not affixed or bonded to shelf 24, which enhances design simplicity and prevents alteration of the collapsibility of the board. Suitable plastic corrugated board is available under the trademark Coroplast.

In assembly of tray 11, the board 15 is placed upon shelf 24, with tops of ribs 29 and 31 providing undersupport as indicated in FIGS. 3 and 4. Board 15 is to serve as the flat substrate to the working surface of tray 11, and the corrugated feature will help to provide a firm yet somewhat resilient support to that surface. The final component of the invention, a flexible plastic coating 39, is then applied evenly by a conventional dipping or spray technique to the entire outer surface of the combined frame 15. It is preferred that coating 39 have a minimum thickness of about 10 mm, and is non-toxic so as to eliminate any hazard of poisoning to children. Applied coating 39 will adhere to the outer surfaces of the frame and board, and although flexible will have sufficient hardness to hold these parts together. Coating 39 will also be selected to give tray 11 moisture-proofing and washability as well as durability. In order to endure sunlight exposure and the wide temperature variations that a vehicle interior may experience, the coating 39 is also preferably UV resistant and durable over an appropriately large temperature range. A suitable coating is available under the trademark Plasti-dip. Note that the coated board 15 presents tray 11 with a working surface that remains sunken so that the upward extensions of the walls of frame 13 will serve as a border for retaining objects placed upon tray 11. As best illustrated in FIG. 3 this working surface slopes somewhat downwardly from front to rear. This feature helps to keep loose articles on the working surface from rolling away from the tray user.

FIG. 5 illustrates a variant of the invention in which a pair of straps 51 is attached to tray 11. Each strap has its upper end portion 53 received in a depressed area (not shown) in the rear face 57 and the upper edge surface 59 so that its outer side lies flush with these tray surfaces. A suitable bonding agent secures ends 53 to tray 11. A strip 61 of Velcro hook material extends substantially along the length of strap 51 to its lower end which has attached a smaller strip 64 of Velcro loop material. Thus equipped, each strap 51 can be adjustably formed into a loop 69 which may be secured around structures within a vehicle, such as a child's safety seat, to hold tray 11 in position adjacent the user's lap.

While a particular embodiment of the invention has been described herein it is not intended that the invention be limited thereto, since various modifications and changes may readily occur to those skilled in the art without departing from the invention. Therefore it is aimed to cover all such changes and modifications as fall within the true spirit and scope of the invention as defined in the claims which follow.

What is claimed is:

1. Safety tray comprising:
   (a) Support frame having a generally rectangular configuration in plan form, a flat bottom, and a front wall, a rear wall and opposing side walls, a sunken planar shelf in the upper surface of said frame bounded by upwardly extending portions of said front, rear and side walls, said planar shelf having an array of a plurality of regularly shaped cavities therein, said cavities bounded by a grid of longitudinally and transversely extending ribs, said frame composed of a low-density, highly resilient polymeric material in molded configuration;
   (b) generally rectangular corrugated top board comprising a flat top sheet and a flat bottom sheet of plastic material with a corrugated plastic layer affixed between said sheets, said corrugated board covering said sunken planar shelf with its lower surface supported in non binding engagement by said ribs, wherein said upwardly extending wall portions provide lateral and longitudinal support to said board, said corrugated board having ridges and furrows lying in a direction parallel to said front and rear frame walls; and
   (c) flexible, resilient plastic outer coating, enveloping the entire outer surface of said combined support frame and corrugated board, and said outer coating holding said board in engagement with said frame.

2. Apparatus as defined in claim 1 wherein the volume of said cavities is a substantial fraction of the total volume of said tray.

3. Apparatus as defined in claim 1 wherein said frame material has a density in the range of 1.0 to 2.0 lbs. per cu. ft.

4. Apparatus as defined in claim 1 wherein said frame material includes steam molded, closed cell, expanded polypropylyne beads.

5. Apparatus as defined in claim 1 wherein the upper surface of said tray has a sunken working surface bounded by said coated, upwardly extending wall portions.

6. Apparatus as defined in claim 4 wherein the average diameter of said beads is about 3/16 inch.

7. Apparatus as defined in claim 1 wherein said support frame has a bottom wall that is uniformly thick.

8. Apparatus as defined in claim 1 wherein said front wall is appreciably higher than said rear wall.

9. Apparatus as defined in claim 1 including a pair of downwardly extending harnessing straps attached at their upper ends to spaced-apart locations on the rear wall of said tray, and each of said straps having a first strip of Velcro material extending substantially along its length and a second strip of Velcro material at its lower end, said second strip having a fastening configuration that is complementary to said first strip.

10. Apparatus as defined in claim 1 wherein the forward end of said top board is at an appreciably greater height above the bottom of said frame than the rear end of said board is above the bottom of said frame

* * * * *